United States Patent [19]
Kato

[11] Patent Number: 5,161,936
[45] Date of Patent: Nov. 10, 1992

[54] INDUSTRIAL ROBOT APPARATUS
[75] Inventor: Hisao Kato, Inazawa, Japan
[73] Assignee: Mitsubishi Denki Kabushiki Kaisha, Tokyo, Japan
[21] Appl. No.: 801,607
[22] Filed: Dec. 5, 1991

Related U.S. Application Data
[63] Continuation of Ser. No. 539,440, Jun. 18, 1990, abandoned.

[30] Foreign Application Priority Data
Jun. 21, 1989 [JP] Japan .................. 1-158862

[51] Int. Cl.⁵ .............................................. B25J 9/16
[52] U.S. Cl. ......................... 414/728; 901/8; 901/49; 901/16; 414/751
[58] Field of Search .............. 414/749, 751, 728, 742; 901/8, 16, 49, 2

[56] References Cited
U.S. PATENT DOCUMENTS

| | | | |
|---|---|---|---|
| 3,884,363 | 5/1975 | Ajlouny | 901/16 X |
| 4,342,535 | 8/1982 | Bartlett et al. | 901/8 X |
| 4,484,293 | 11/1984 | Minucciani et al. | 901/8 X |
| 4,781,517 | 11/1988 | Pearce et al. | 901/16 X |
| 4,890,241 | 12/1989 | Hoffman et al. | 901/8 X |
| 4,947,702 | 8/1990 | Kato | 74/479 |

FOREIGN PATENT DOCUMENTS

| | | | |
|---|---|---|---|
| 0266056 | 5/1988 | European Pat. Off. | 901/8 |
| 61-297041 | 12/1986 | Japan | 901/8 |
| 62-55710 | 3/1987 | Japan | 901/8 |
| 2-53585 | 2/1999 | Japan | 901/8 |

Primary Examiner—Michael S. Huppert
Assistant Examiner—William M. Hienz
Attorney, Agent, or Firm—Leydig, Voit & Mayer

[57] ABSTRACT

An industrial robot apparatus of the present invention comprises a rail, a plurality of robots which use the rail in common, which are disposed so as to be movable along the rail and which are respectively stopped on the rail so as to perform a robot work, a work command unit for instructing at least one of the plurality of robots to perform a predetermined robot work, and a controlling unit for maintaining the other robots in a predetermined state when the robot, which is instructed from the work command unit, works.

3 Claims, 6 Drawing Sheets

INDUSTRIAL ROBOT APPARATUS

This application is a continuation of application Ser. No. 07/539,440, filed Jun. 18, 1990, now abandoned.

BACKGROUND OF THE INVENTION

1. Field of the Invention

The present invention relates to an industrial robot apparatus having a plurality of robots, which use a rail in common.

2. Description of the Related Art

An example of conventional industrial robot apparatuses is an apparatus having a plurality of robots which use a rail in common, as disclosed in Japanese Patent Application No. 62-247214.

In such an apparatus, each of the robots is moved by being guided along the rail and is exclusively engaged in a separate working process so that robot works such as processing of a work piece can be performed with high productivity.

In the above conventional industrial robot apparatuses, however, when one robot works, deflection of the rail, which is caused by the movement of another robot, sometimes causes the displacement of the robot which works. Such displacement of the robot, which works, causes a decrease in working precision according to working processes.

It can be also thought that the rail is installed on the ceiling of a factory so that the floor is effectively used. However, it is difficult to increase the rigidity of the rail installed, and the position and state of the robot, which works, are changed by the movement of another robot.

There is thus a problem in that necessary working precision cannot be obtained.

SUMMARY OF THE INVENTION

The present invention has been achieved in a view to resolving the above problem, and it is an object of the present invention to provide an industrial robot apparatus which permits the attainment of high working precision.

The industrial robot apparatus in accordance with the present invention comprises a rail, a plurality of robots which use the rail in common, which are disposed so as to be movable on the rail and which are stopped on the rail to perform robot works, a work command means for instructing at least one of a plurality of the robots to perform a predetermined robot work, and a control means for maintaining the other robots in a predetermined state when the robot, which is instructed to perform a robot work from the work command means, works.

DESCRIPTION OF THE PREFERRED EMBODIMENTS

Embodiments of the present invention are described below with reference to the accompanying drawings.

Figure 1:
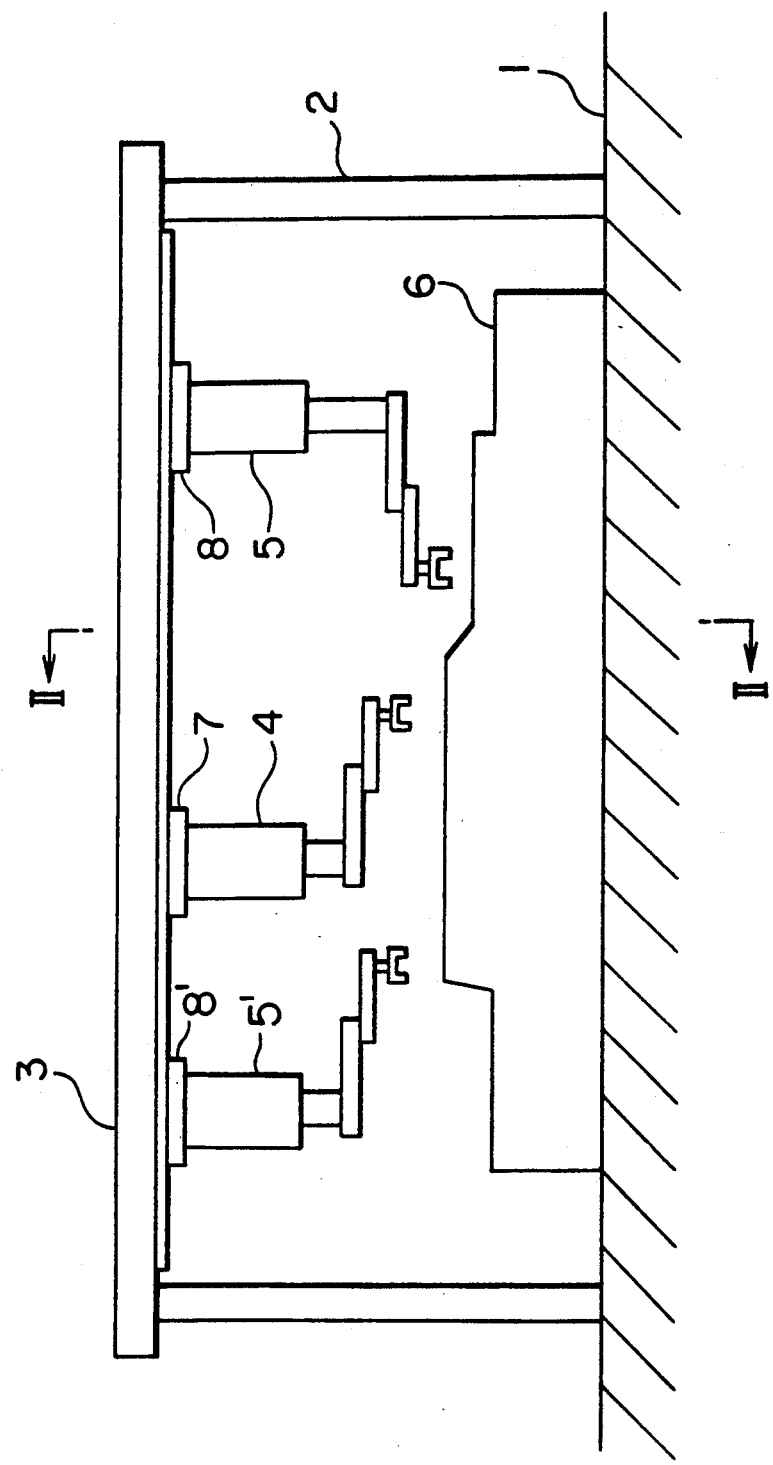
FIG. 1 is a front view of an industrial robot apparatus in a first embodiment of the present invention.
Figure 2:
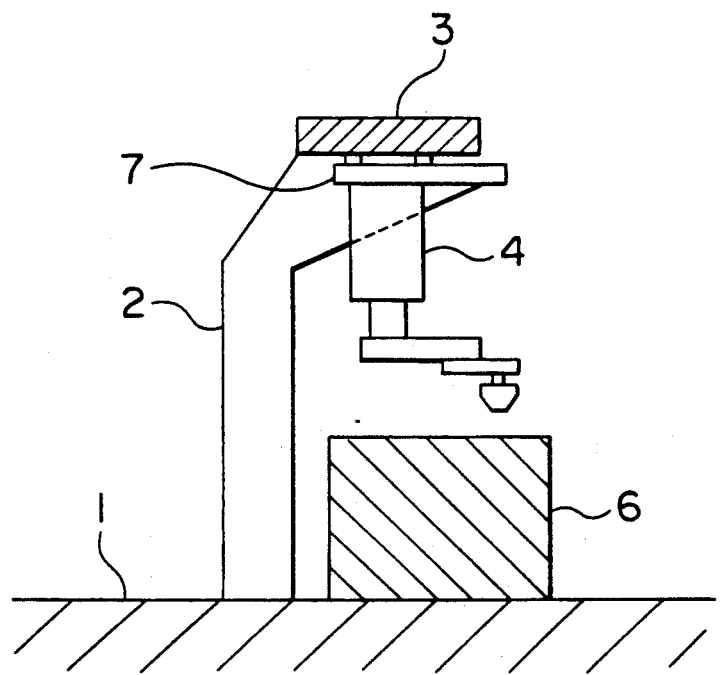
FIG. 2 is a sectional view taken along the line II—II in FIG. 1.

In FIGS. 1 and 2, a plurality of pillars 2 are erectly provided on the floor 1 of a factory or the like so as to support a rail 3. A first robot 4 and a second robot 5 are provided on the rail 3 so as to be hung therefrom and movable along the rail 3. The first and second robots 4 and 5 are provided with driving units 7 and 8, respectively. A work piece 6 is loaded on the floor 1.

Figure 3:
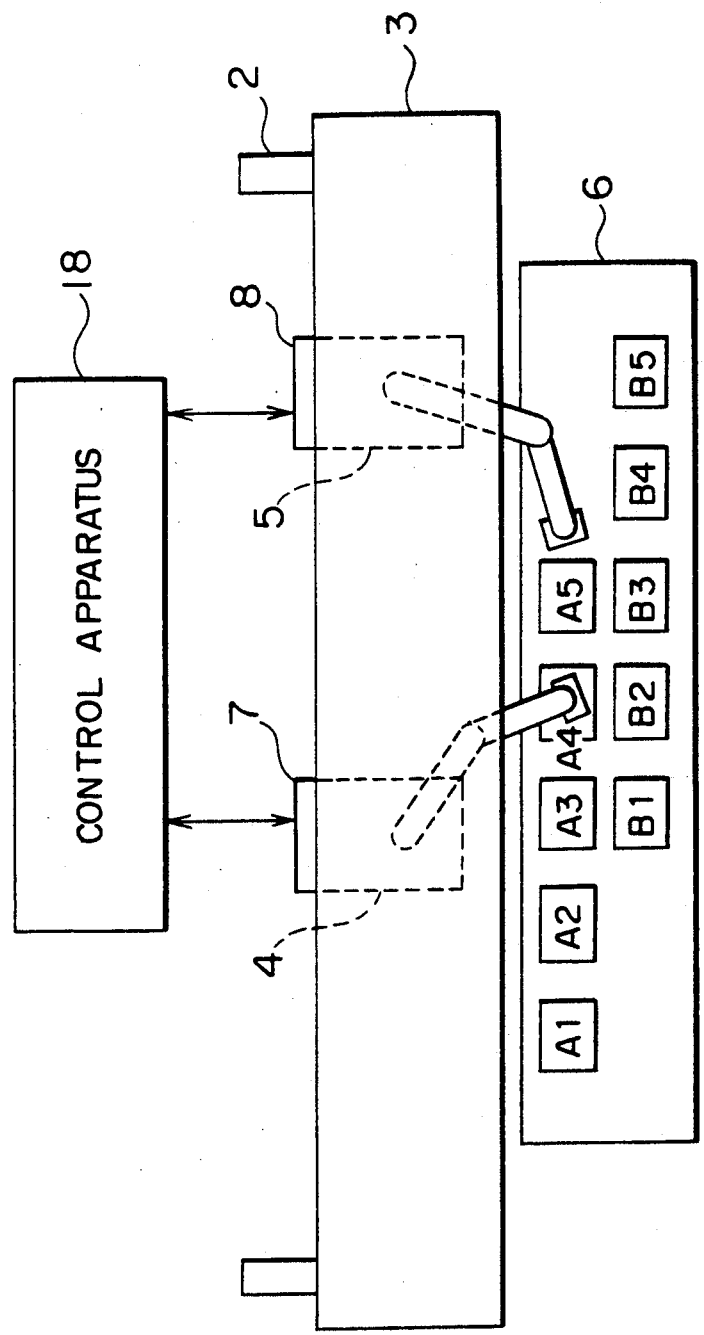
FIG. 3 is a plan view of the first embodiment.

As shown in FIG. 3, work points A1 to A5 and B1 to B5 are set on the work piece 6. A control apparatus 18 is also connected to the driving unit 7 for the first robot 4 and the driving unit 8 for the second robot 5.

Figure 4:
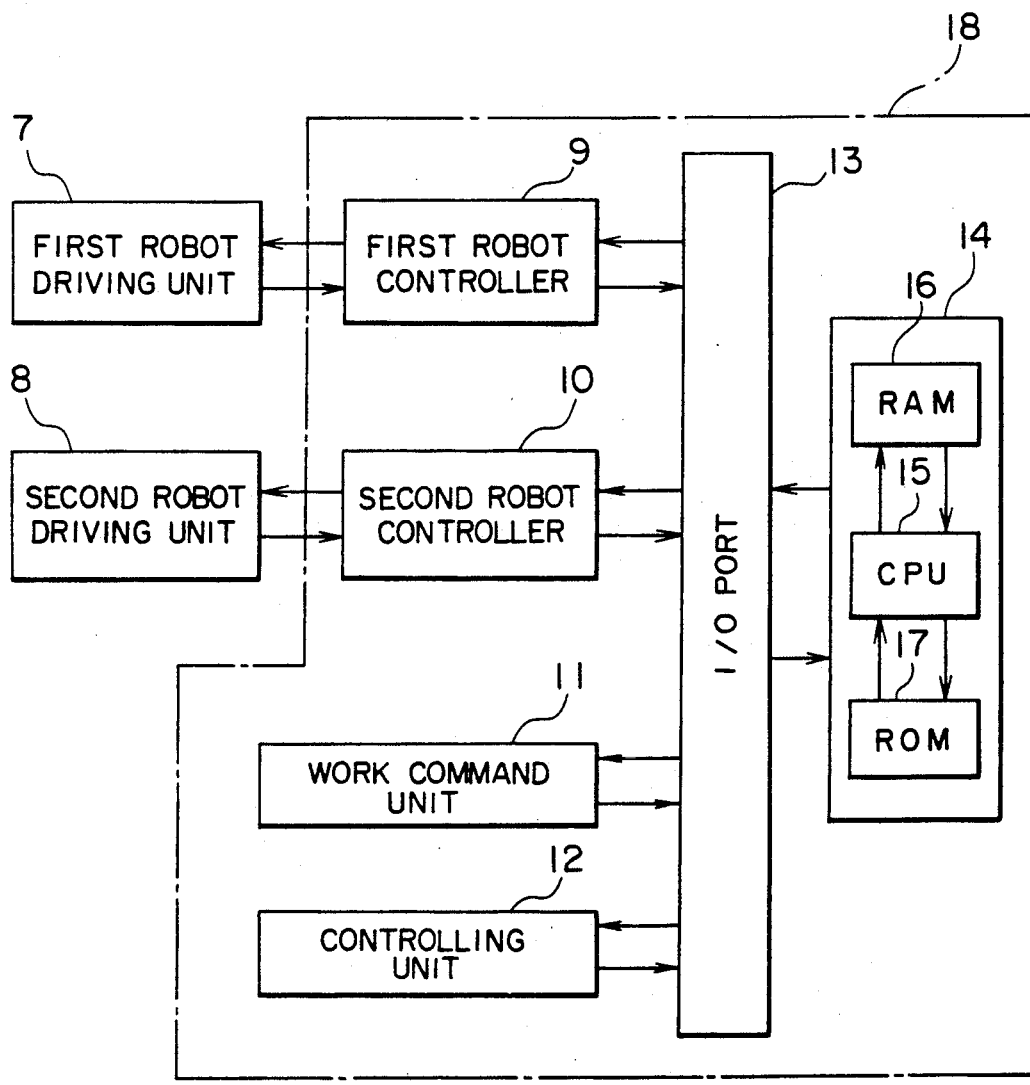
FIG. 4 is a block diagram of a control apparatus in the first embodiment.

As shown in FIG. 4, the control apparatus 18 has a first robot controller 9 and a second robot controller 10 which are connected to the driving units 7 and 8, respectively, the controllers 9 and 10 being connected to an I/O port 13. To the I/O port 13 are connected a work command unit 11 and a controlling unit 12. The work command unit 11 has a first stored program for operating the first and second robots 4 and 5, and the controlling unit 12 has a second stored program for controlling the movements of the first and second robots 4 and 5. A computer 14 is also connected to the I/O port 13. The computer 14 is provided with CPU 15 and RAM 16 and ROM 17 which are connected to the CPU 15.

A description will now be given of the operation of the first embodiment with reference to the flow chart shown in FIG. 5. In the drawing, it is assumed that the first robot 4 successively performs works A1 to A5 at the work points A1 to A5 on the work piece 6 and that the second robot 5 successively performs works B1 to B5 at the work points B1 to B5.

In Step 19, the first robot 4 and the second robot 5 are first moved, responsive to coordinated movement commands of a normal mode, to the work points A1 and B1 by the controllers 9 and 10, respectively, in the control apparatus 18. In Step 20, the first robot 4 and the second robot 5 concurrently perform the works A1 and B1, respectively, on the basis of coordinated work commands of a first type corresponding to the command output from the first stored program of the work command unit 11. Similarly, the first and second robots 4 and 5 are moved to the work points A2 and B2, respectively, in Step 21 and then concurrently perform the works A2 and B2, respectively, on the basis of the command output from the first stored program of the work command unit 11 in Step 22.

Responsive to coordinated work commands of a second type, and coordinated movement commands of a high precision mode, the second robot 5 is then kept at a stopped state on the basis of the command from the controlling unit 12 in Step 23, while the first robot 4 is moved to the work point A3 in Step 24 and then performs the work A3, which requires high precision, on the basis of the command from the work command unit 11 in Step 25. After the work A3 is completed, the first robot 4 is kept at a non-working state on the basis of the command from the controlling unit 12 in Step 26, and the movement to the work point A4 is then started. The second robot 5 is moved to the work point B3 in Step 27 and the performs the work B3 in Step 28.

When the first and second robots 4 and 5 are completely moved to the work points A4 and B4, respectively, in Step 29, the first and second robots 4 and 5 concurrently perform the works A4 and B4, respectively, on the basis of the command from the work command unit 11 in Step 30.

The first robot 4 is then retracted to one end of the rail 3, which is separated from the second robot 5, on the basis of coordinated movement commands of a collision avoidance mode according to the command from the controlling unit 12 in Step 31. In this state, the second robot 5 is moved to the work point B5 in Step 32 and performs the work B5 on the basis of the command from the work command unit 11 in Step 33. At this time, since the first robot 4 has been already retracted, the second robot 5 does not contact with the first robot 4 even if the arm of the second robot 5 is greatly moved during the work B5.

When the work B5 is completed in the above-described manner, since a series of works is completely carried out by the second robot 5, the second robot 5 is kept at a halt state on the basis of the command from the controlling unit 12 in Step 34. While the first robot 4 is moved to the work point A5 in Step 35 and performs the work A5 on the basis of the command from the work command unit 11 in Step 36.

Although a series of works are completed by the first and second robots 4 and 5 in Steps 19 to 36, when the work piece 6 is replaced by a new work piece, a series of works are carried over again from Step 19.

In this way, when a work must be carried out with high precision by using one of the first and second robots 4 and 5 or when there is a danger that one of the robots 4 and 5 contacts with the other, the other robot is maintained in a predetermined state such as a stopped or retracted state. It is therefore possible to make an attempt to increase the precision, efficiency and safety of a work by using the industrial robot apparatus in which the rail 3 is used by a plurality of the robots 4 and 5 in common so that the cost of equipment can be reduced.

Figure 5:
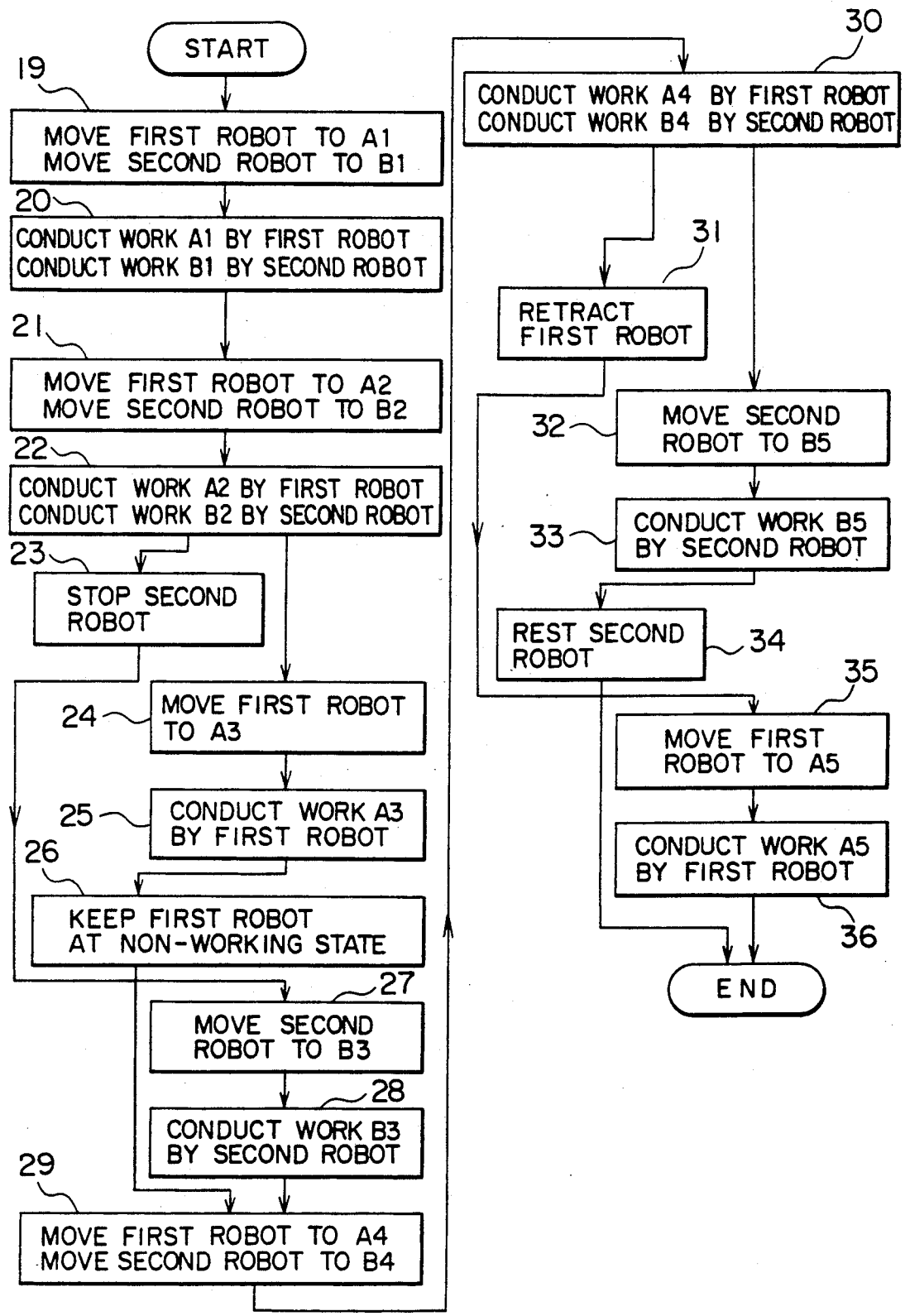
FIG. 5 is a flow chart which shows the operation of the first embodiment.

In the industrial robot apparatus, the robot works are previously instructed by the work command unit 11 and the controlling unit 12 in accordance with the control sequence shown in the flow chart in FIG. 5. The safety and precision of the robot works are thus certainly increased.

Figure 6:
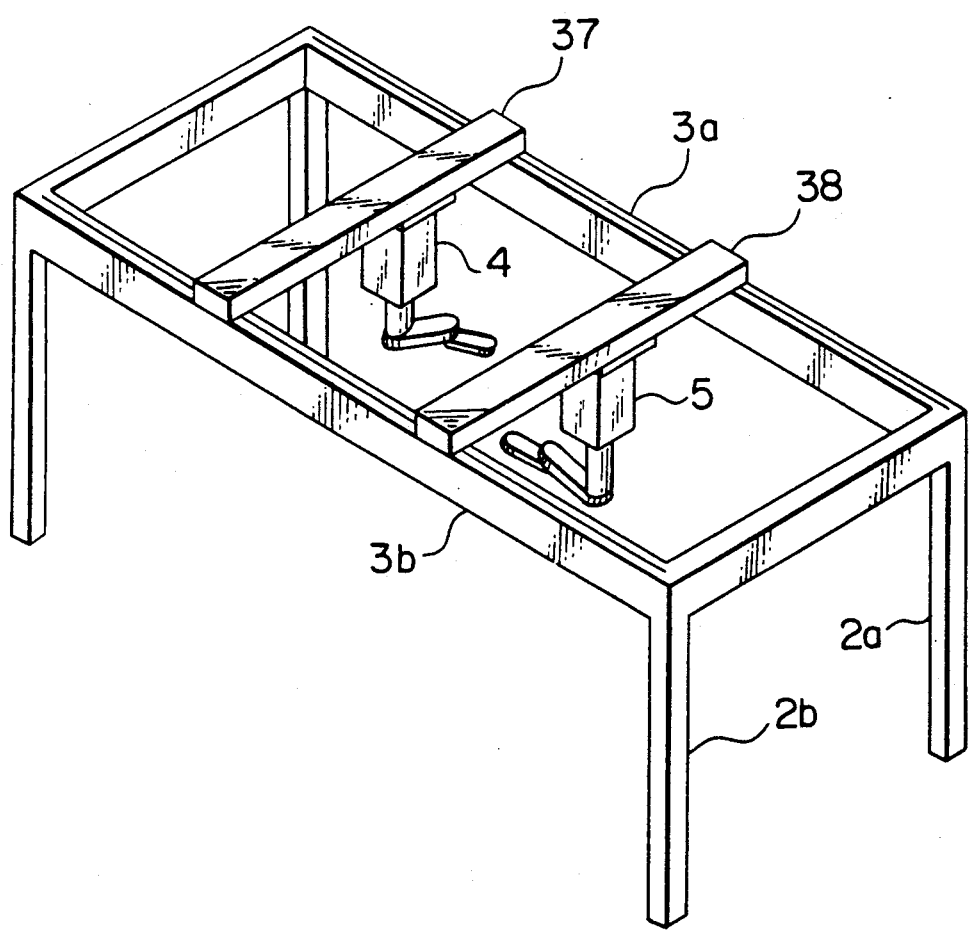
FIG. 6 is a perspective view of a second embodiment.

FIG. 6 shows a second embodiment of the present invention. In this embodiment, two parallel rails 3a and 3b are supported by pillars 2a and 2b. Traversing rails 37 and 38 are movably supported by the rails 3a and 3b at both ends thereof. A first robot 4 and a second robot 5 are supported by the traversing rails 37 and 38, respectively, so as to be movable along the traversing rails 37 and 38. The same robot works as those in the first embodiment are performed by using the same controlling unit as the controlling unit 12 in the first embodiment shown in FIG. 4. Namely, one of the robots 4 and 5 is maintained in a predetermined state such as a stopped or retracted state when the other robot performs a work so that an attempt can be made to increase the precision and safety of the works.

Although each of the above embodiments concerns a case having the two robots, an embodiment is not limited to this, and three or more robots (such as 7, 8, 8' of FIG. 1) may be supported by one rail.

What is claimed is:

1. An industrial robot apparatus comprising:

a rail arrangement;

a plurality of robots including a first robot and a second robot located on and movable along a first rail of said rail arrangement to different work locations;

a first driving means for moving said first robot along said rail arrangement;

a second driving means for moving said second robot along said rail arrangement;

a first robot controller connected to said first driving means for operating said first robot;

a second robot controller connected to said second driving means for operating said second robot;

a work command means, connected to said first and second robot controllers, for sending coordinated work commands of a first type, instructing said first and second robots to simultaneously perform respective predetermined work tasks of less than a predetermined high precision, and for sending coordinated work commands of a second type, instructing said first robot to perform no work task while simultaneously instructing said second robot to perform a predetermined work task, and a controlling means, connected to said work command means and both said first and second robot controllers, for sending coordinated movement commands of a normal mode, corresponding to work commands of the first type, instructing said first and second robots to simultaneously move to respective predetermined work positions along said rail arrangement, for sending coordinated movement commands of a high precision mode, corresponding to work commands of the second type where the second robot work task is of precision greater than the predetermined high precision, instructing the second robot to move to a predetermined position and simultaneously instructing said first robot to remain parked idly while said second robot performs the greater precision work task thereby avoiding deflections of the first rail by movement of said first robot, and for sending coordinated movement commands of a collision avoidance mode, corresponding to work commands of the second type, instructing said second robot to move to and park at a predetermined position and simultaneously instructing said first robot to move to a remote position along said rail arrangement removed from said second robot.

2. An apparatus according to claim 1, wherein said controlling means, in sending movement commands in the collision avoidance mode, includes commands which retract certain robots to one end of said rail arrangement while maintaining them in a retracted state before another robot performs the predetermined robot work task under command of said work command means.

3. An apparatus according to claim 1, wherein said rail arrangement comprises a single main rail.

* * * * *

UNITED STATES PATENT AND TRADEMARK OFFICE
CERTIFICATE OF CORRECTION

PATENT NO. : 5,161,936

DATED : November 10, 1992

INVENTOR(S) : Hisao Kato

It is certified that error appears in the above-identified patent and that said Letters Patent is hereby corrected as shown below:

On the title page,
Item no. 56, References Cited, Foreign Patent Documents,
change "2-53585  2/1999  Japan ........ 901/8"
to --2-53585  2/1990  Japan ........ 901/8--.

Signed and Sealed this

Twelfth Day of October, 1993

Attest:

BRUCE LEHMAN

*Attesting Officer*  *Commissioner of Patents and Trademarks*